United States Patent
Berger et al.

(10) Patent No.: US 6,657,410 B1
(45) Date of Patent: Dec. 2, 2003

(54) CONTROL DEVICE FOR A WINDSCREEN WIPER DEVICE

(75) Inventors: Josef Berger, Wolfachlugen (DE); Alf Blessing, Haimisgen (DE); Roland Mauser, Ludwigsburg (DE); Rainer Mackel, Königswinter (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/647,399

(22) PCT Filed: Nov. 3, 1998

(86) PCT No.: PCT/EP98/06939

§ 371 (c)(1),
(2), (4) Date: Sep. 29, 2000

(87) PCT Pub. No.: WO99/32335

PCT Pub. Date: Jul. 1, 1999

(30) Foreign Application Priority Data

Dec. 19, 1997 (DE) .......................... 197 56 504

(51) Int. Cl.⁷ ............... H02P 1/04; G05B 5/00
(52) U.S. Cl. .................. 318/483; 318/444; 318/446; 15/250.12
(58) Field of Search ................. 318/443, 444, 318/445, 446, 458, 465, 466, 470, 483, 484, DIG. 2; 15/250.12, 250.13, 250.18

(56) References Cited

U.S. PATENT DOCUMENTS

| 5,119,002 A | * | 6/1992 | Kato et al. ............... 318/444 |
| 5,336,980 A | * | 8/1994 | Levers ..................... 3181/444 |
| 5,412,296 A | * | 5/1995 | Chien et al. ............... 318/444 |
| 5,428,277 A | * | 6/1995 | Stanton ..................... 318/444 |
| 5,648,707 A | * | 7/1997 | Salliotte ................... 318/443 |
| 5,654,617 A | * | 8/1997 | Mills ........................ 318/444 |
| 5,682,788 A | * | 11/1997 | Netzer ...................... 318/444 |
| 5,729,106 A | * | 3/1998 | Pientke et al. ............. 318/443 |
| 5,786,676 A | * | 7/1998 | Ogawa et al. .............. 318/444 |
| 6,097,024 A | * | 8/2000 | Stam et al. ................. 318/444 |
| 6,239,570 B1 | * | 5/2001 | Tanaka et al. ......... 318/DIG. 2 |
| 6,353,392 B1 | * | 3/2002 | Schofield et al. .......... 318/444 |
| 6,420,845 B1 | * | 7/2002 | Mackel et al. ............. 318/443 |

FOREIGN PATENT DOCUMENTS

| DE | 3926175 C1 | 9/1990 |
| DE | 4200700 A1 | 7/1993 |
| DE | 19516507 A1 | 11/1995 |
| DE | 19756504 A1 | 7/1999 |
| EP | 0504606 A1 | 9/1992 |
| EP | 537471 A1 | 4/1993 |
| EP | 0786385 A1 | 7/1997 |

* cited by examiner

Primary Examiner—Robert E. Nappi
Assistant Examiner—Eduardo Colon-Santana
(74) Attorney, Agent, or Firm—Venable LLP; Norman N. Kunitz

(57) ABSTRACT

A control device for the drive motor of a windscreen wiper device in a vehicle, especially a motor vehicle, comprising a control switch which can be activated by means of a manually actuated wiper switch and which automatically controls the drive motor in a switching stage of said wiper switch according to a rain sensor signal corresponding to a characteristic curve. The operating data for the drive motor varies according to the external effects of lighting, temperature, or speed parameters.

22 Claims, 3 Drawing Sheets

CONTROL DEVICE FOR A WINDSCREEN WIPER DEVICE

BACKGROUND OF THE INVENTION

The invention relates to a control device for the drive motor of a windshield wiper device on a vehicle, in particular a motor vehicle, comprising a control circuit that can be activated by a manually operated wiper switch and automatically controls the drive motor in one switching stage of the wiper switch in accordance with a characteristic curve and depending on a signal from a rain sensor.

The control device taken into consideration for the drive motor control of a windshield wiper device in a motor vehicle comprises a control circuit, which can be activated by means of a manually activated wiper switch. The wiper switch assigned to the steering column of the vehicle has a multi-stage design. In a first switching stage of the wiper switch, the drive motor for the windshield wiper device is controlled by a characteristic curve, which is scanned in dependence on the signal from a rain sensor and controls the drive motor accordingly. In the process, the operating data deposited for the drive motor contain the control information that the drive motor is operated intermittently in the starting range of the characteristic curve. Depending on the amount of rain hitting the windshield, which is detected by the rain sensor, the interval time between each wiping cycle is reduced if the rain amount increases. The drive motor is switched to the continuous operation if the value for the interval time falls below a predetermined value, wherein its speed initially is at a minimum. With increasing amounts of rain, the speed is then increased by the control until it reaches a maximum speed with a correspondingly increased number of wiping cycles per time unit.

SUMMARY OF THE INVENTION

It is the object of the invention to specify measures for a control device of the type described above, which permit an optimum wiper operation for different influences effecting the vehicle, particularly brightness, temperature, blinding by other traffic participants or light sources and/or driving speed.

This object generally is solved according to the invention by a control device for the drive motor of a windshield wiper device on a vehicle, in particular a motor vehicle, comprising a control circuit that can be activated by a manually operated wiper switch and automatically controls the drive motor in one switching stage of the wiper switch in accordance with a characteristic curve and depending on a signal from a rain sensor, and wherein the operating data for the drive motor can be changed in dependence on the effects of lighting and/or temperature and/or driving speed that act upon the vehicle from the outside. Further embodiments are specified and/or discussed in the description.

In an embodiment of a control device according to the invention, a predetermined standard characteristic curve is replaced with a predetermined limit characteristic curve, depending on light and/or temperature influences that effect the vehicle from the outside, so that the operating data for the drive motor of the windshield wiper can be changed. In particular, a change in the operating data is planned if environmental conditions, gespecially brightness, temperature and/or speed, respectively deviate from a predetermined limit value and in particular if they fall below this value.

The wiper switch is preferably provided with several switching stages for this, wherein the automatic characteristic curve operation is assigned to the first switching stage and one or several fixed speed(s) is (are) assigned to one or several additional switching stages. If the values fall below the limit values for temperature and/or light intensity during the windshield wiper operation, a limit characteristic curve that is changed relative to the standard characteristic curve is provided in the control circuit, wherein the characteristic curves have a fixed upper end point. A preferred limit value for the light intensity in this case is the light intensity that normally exists while the vehicle driving lights are turned on, which results in the danger of blinding. A preferred limit value for the temperature is the temperature around the freezing point because it is to be expected that water mixed with salt hits the vehicle windshield, which can lead to a smearing of the windshield during the wiper operation, thus increasing the danger of blinding and/or reducing the visibility.

The transition from the standard characteristic curve to the limit characteristic curve in that case can occur at least quasi-continuously via intermediate characteristic curves between the standard characteristic curve and the limit characteristic curve. The intermediate characteristic curves, standard characteristic curve and limit characteristic curve all have a fixed upper end point (M). The speed of the transition from a standard characteristic curve to a limit characteristic curve advantageously depends on the degree to which the temperature and/or light intensity deviate from the respective limit values. Thus, the wiper operation is at an optimum if possible even during twilight hours and/or with slowly dropping or increasing temperatures. However, the transition from the standard characteristic curve to the changed limit characteristic curve can also be abrupt.

If the light intensity that affects the vehicle is below a predetermined light intensity, the drive motor speed is increased and/or interval pauses of the wiper operation are shortened and/or the transition from intermittent operation to continuous operation is shifted to lower rain amounts. It is useful if the drive motor speed is lowered for temperatures below a limit temperature and/or the interval pause time of the wiper operation is increased and/or the transition from intermittent to continuous wiper operation is shifted to higher rain amounts. Given a light intensity and temperature below the respective limit values, it is advantageous if the drive motor speed as well as the interval pauses of the wiper operation are increased and/or the transition from intermittent operation to continuous wiper operation is shifted to lower rain amounts. It is particularly favorable if the wiper operation with windshield-washing function is controlled in a corresponding manner.

For one advantageous modification of a control device, an adaptive characteristic curve for the wiping operation is additionally generated, which is changed by means of manually operated control means if it does not meet the individual requirements of the motor-vehicle user. For this, the pause time between two wiper operations can be changed during the intermittent operation and/or the drive motor speed or the wiping frequency can be increased or lowered during the subsequent, continuous wiper operation. The wiper switch is preferably provided with the standard three switching stages, wherein the automatic characteristic curve operation is assigned to the first switching stage, while one or several fixed speed(s) is (are) assigned to the one or several additional switching stage(s). The operating data predetermined by the manufacturer for controlling the drive motor for the windshield wiper device are programmed to meet average requirements. After switching on the automatic characteristic curve operation, an intermittent operation with long pause times is controlled automatically for small rain amounts, depending on the amount of rain per time unit that is detected by a rain sensor. The pause times will decrease with increasing amounts of rain. If the rain amounts increase even further, the drive motor will change to a continuous operation, wherein the speed is increased up to a maximum value if the amount of rain increases accordingly.

If the specified characteristic curve does not control a wiper characteristic that meets the personal ideas of the driver, the characteristic curve can be changed by switching on additional switching stages of the wiper switch. If, for example, the pause times during the intermittent operation are too long or the wiper frequency during the continuous operation is too low, the wiper switch must only be switched to one of the additional stages with the fixed, predetermined speeds. This switching measure is recorded in the control unit and the slope of the characteristic curve is reduced by means of an adaptation algorithm control, triggered by this measure. The end point of the characteristic curve remains at least for the most part fixed in the maximum operating point of the drive motor. As a result of this pivoting upward of the characteristic curve, around the maximum operating point, the operating data assigned to this characteristic curve for the drive motor are changed in such a way that the pause times during the intermittent operation are respectively shortened and the drive motor speed or the windshield wiper wiping frequency in the characteristic curve segment of the continuous operation is raised. A switching of the wiper switch from stage 1 to stage 2 can cause a specified change. In contrast, a switching through from stage 1 to stage 3 makes it possible to control a stronger raising of the characteristic curve. As a result of a repeated switching back and renewed switching up of the wiper switch, a stage-by-stage raising of the characteristic curve or the stage-by-stage reduction of the increase by means of the algorithm control can be effected. A switching back of the wiper switch to the first switching stage for the automatic operation thus always makes available a characteristic curve that approaches the driver needs for a rain-dependent control of the windshield wiper device.

On the other hand, if the operating data supplied to the drive motor by the rain-dependent operating point data result in a wiping sequence that is too high for the individual requirements of the driver, the data for the characteristic curve can be changed back through a steeper increase in the slope of the characteristic curve, longer pause times for the intermittent operation, and a slower wiping frequency in the superimposed characteristic curve range. It is assumed that the actual characteristic curve for the automatic, rain-amount dependent operation is actuated in a range that is above the number of wiping cycles or the drive motor speed and is fixedly predetermined by position 2 of the wiper switch. Thus, if the user of the wiper switch switches from the switching position 1 for the automatic operation to the switching position 2, the operating data specified by the switching position 2 are below the data specified by the actual characteristic curves. The control signal obtained in this way causes a reduction of the operating data in the algorithm control, not only for this operating point, but for the complete characteristic curve. In the process, the operating point of the characteristic curve, which is assigned to the highest, detected rain amount, remains again unchanged. A new characteristic curve can be determined for this in each case, or it is possible to switch to one of several fixedly predetermined characteristic curves. Furthermore, if the wiper switch is turned to the zero position during the operation and the rain sensor still signals a rain amount worth mentioning to the control circuit, a control command obtained in this way can be used to change the slope of the characteristic curve or to change the curve course, such that the pause times during the intermittent operation are increased and the continuously occurring wiping cycles in the upper range of the characteristic curve are reduced.

In the following, the invention is explained further with the aid of basic diagrams.

DETAILED DESCRIPTION OF THE INVENTION

Figure 1:
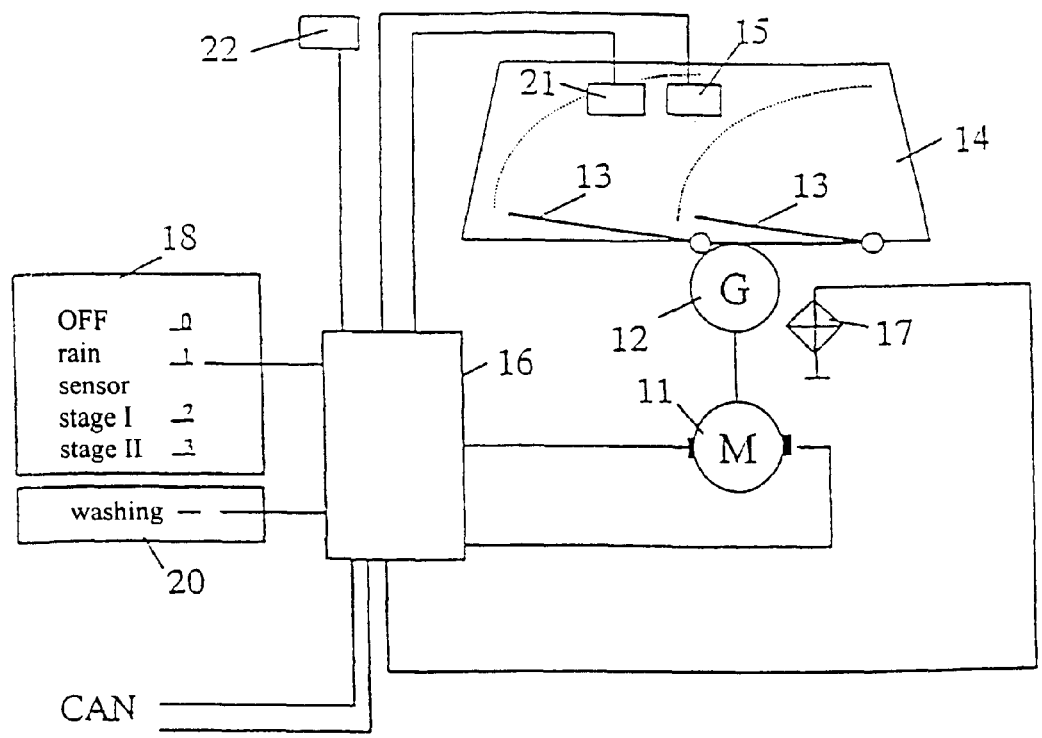
FIG. 1 is switching diagram for a control device for a windshield wiper device according to the invention.

FIG. 1 shows a control device for a drive motor 11, which impresses back and forth wiping cycles onto windshield wipers 13 with the aid of a gear 12. The windshield wipers 13 rest on a windshield 14 to be wiped, to which a rain sensor 15 is assigned. The rain sensor 15 supplies an electric control signal, which depends on the amount of rain per time unit, which hits the area of the windshield that is covered by the sensor. The rain-dependent control signal is supplied to a control circuit 16. With a measuring unit 17, the control circuit 16 can determine the actual speed of the windshield wiper motor 11 and thus also the number of wiping cycles. A switch for a windshield-washing device 20 is arranged as additional input unit, and a wiper switch 18 is connected directly or via a bus system to the control circuit 16. Normally, this switch is mounted as steering column switch on the steering column of the respective vehicle and, in addition to the zero position for shutting down the drive motor 11, contains additional switching stages 1, 2, 3 for switching up or down, in accordance with the various operating states. An optical sensor 21, which is preferably arranged on the windshield and adjacent to the rain sensor 15, determines the brightness of the surrounding area and/or the blinding. It is advantageous if the rain sensor as well as the sensors for determining the brightness and blinding are combined to form a single optical sensor. A temperature sensor 22 transmits the determined outside temperature values to the control circuit 16. The characteristic curve stored in the control circuit 16, which describes the connection between rain amount and wiping speed or interval pause time, is adapted in dependence on the data provided by the sensors 21 and 22, such that the highest optimum wiping speed is adjusted.

Figure 2:
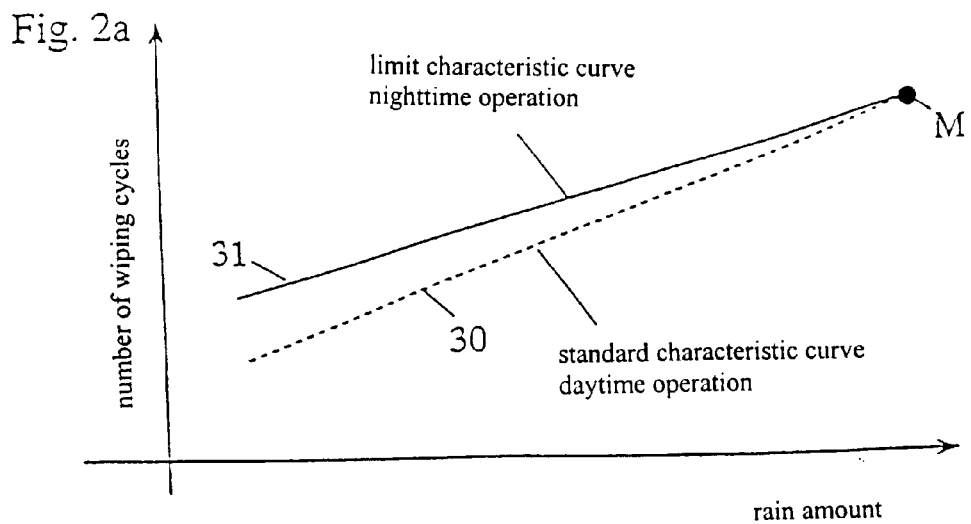
FIG. 2 shows a basic diagram for changing a characteristic curve assigned to a control device according to the invention.
Figure 2:
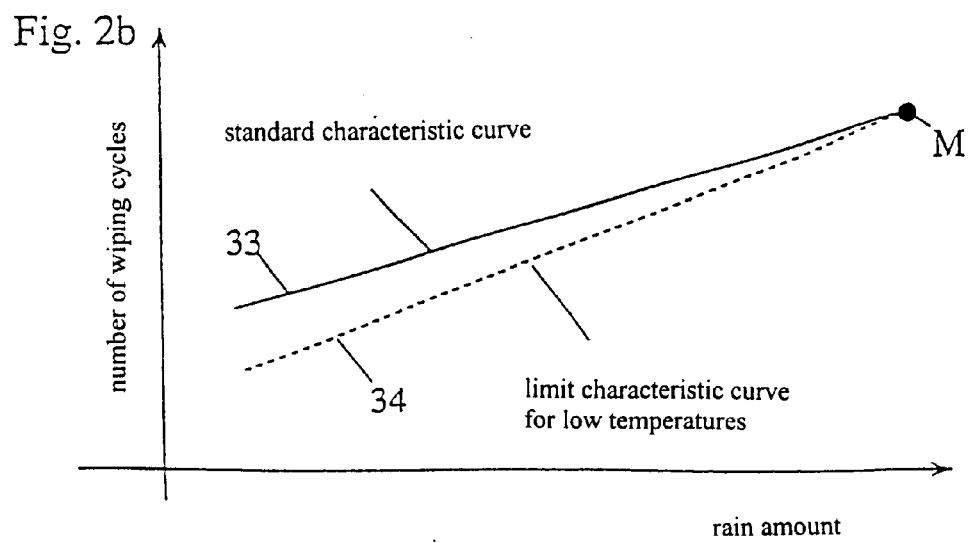

In a first switching stage 1, the drive motor 11 is controlled during daylight in accordance with a characteristic curve 30. This curve is deposited in the control circuit 16 as standard characteristic curve 30 for daylight and specifies operating data for the drive motor 11 in dependence on the amount of rain determined by the rain sensor 15, which is shown in FIG. 2a. Based on the operating data deposited with the characteristic curve 30, the drive motor 11 is operated intermittently if the rain sensor 15 detects a small rain amount. In that case, a pause occurs after each wiping cycle, consisting of a back and forth movement of the windshield wiper 13, until the following wiping cycle occurs. With increasing amounts of rain, the respective pause time is shortened. As soon as the pause time falls below a specified value, a continued operation of drive motor 11 with low speed is controlled by the characteristic curve 30 if the rain amount is correspondingly increased. If the detected rain amount increases even further, the drive motor 11 speed is also adjusted to higher values until it reaches its maximum value M for high rain amounts. With a decreasing rain amount, the drive motor 11 is controlled in the opposite direction. The characteristic must be shifted with decreasing light intensity for an adaptation of the characteristic line to the surrounding brightness. For this, the interval pause times must be shortened and the transition between intermittent wiping operation and continuous wiping operation must be shifted toward lower degrees of wetting or rain amounts and the characteristic curve for the continuous wiping must be raised. It means that the wiping speed must be increased if the wetting of the windshield remains constant but the darkness increases. If a value falls below a predetermined limit value for the light intensity, it is possible to switch from a standard characteristic curve 30 for daylight to a limit characteristic curve 31 for nighttime. With the adaptation of the characteristic curve, the point M that represents the maximum motor 11 speed preferably remains unchanged. However, a characteristic curve adaptation for which this point is changed is also possible.

By taking into account the outside temperatures, which can be determined in or on the vehicle with a temperatures sensor 22, the standard characteristic curve for the wiping operation can be lowered, which is shown in FIG. 2b. Given a constant degree of wetting or a constant rain amount, the wiping speed is reduced below a limit temperature, preferably near the freezing point (0° C.). In that case, the temperature is only an indication that salt is present with a high probability on the driving surface. This salt is kicked up by other vehicles and hits the windshield 14, resulting in the danger of smearing the windshield 14 during the wiping operation.

If the wiper must be used during darkness and at temperatures below the freezing point, one of the operating states darkness or cold, meaning salt on the driving surface, must be given precedence.

Different vehicle speeds lead to different drop sizes on the windshield. In order to obtain an optimum wiping function, it is therefore useful to provide the driven speed and/or the average drop size on the windshield 14 of the vehicle as additional input value(s) for the adaptation of the characteristic curve.

It is favorable if the characteristic curve adaptation is also used for the washing function of wiper switch 18. In that case, one or several washing cycles are triggered with additional wetting of the windshield.

The transition from the standard characteristic curve 30, 33 to the limit characteristic curve 31, 34 can be adapted so-to-speak continuously, preferably via the intermediate characteristic curves between the standard characteristic curve 30, 33 and the limit characteristic curve 31, 34, to the slowly changing brightness and/or the temperature, or it can be switched abruptly if the value falls below the limit value.

Another advantageous measure provides for a change in the drive motor 11 speed, not only during the switching stage I with automatic operation, but in at least one other switching position, particularly the switching stage 2 (so-called switching stage 1 of the wiper) and/or 3 (so-called stage II of the wiper). For the night-time operation, it is advantageous if the speed is raised in stage I, for example from 40 cycles/minute to 45 cycles/minute.

Figure 3:
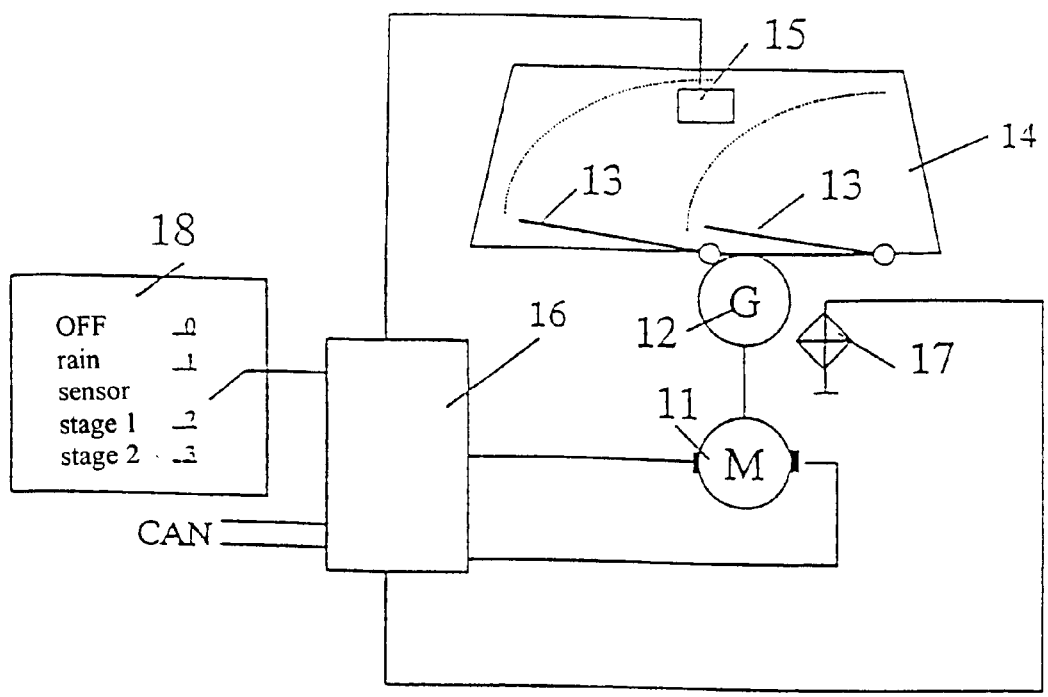
FIG. 3 is a modification of the A switching diagram of FIG. 1 for a control device of a windshield wiper device according to the invention.

A control device for a drive motor 11 impresses back and forth wiping movement cycles (FIG. 3) onto the windshield wipers 13 by means of a gear 12. Temperature sensor 22 and light sensor 21 from FIG. 1 are not shown in further detail herein. The windshield wipers 13 rest on a windshield 14 to be wiped, to which a rain sensor 15 is assigned. The rain sensor 15 delivers an electric control signal, which depends on the amount of rain per time unit that hits the windshield area covered by the sensor. The control signal that depends on the rain amount is supplied to a control circuit 16. With a measuring unit 17, the control circuit 16 can determine the actual speed of the windshield wiper motor 11 and thus the wiping cycles. In addition, a wiper switch 18 is connected as input unit directly or via a bus system to the control circuit 16. This switch is normally mounted as steering column switch on the steering column of the respective vehicle and, in addition to a zero position for shutting down the drive motor 11, also contains the switching stages 1, 2, 3 for switching back and forth in accordance with different operating states. In a first switching state 1, the drive motor 11 is controlled on the basis of a characteristic curve 19, which is deposited in the control circuit 16 and specifies operating data for the drive motor 11 in dependence on the amount of rain determined by the rain sensor 15. The characteristic curve 19 corresponds to standard characteristic curves such as the characteristic curves 30, 33 as well as the limit characteristic curves 31, 34. Based on the operating data deposited in the characteristic curve 19, the drive motor 11 is operated intermittently if the amount of rain detected by the rain sensor 15 is low. In that case, a pause follows each wiping cycle that consists of a pivoting back and forth movement of the windshield wiper 13, until the next wiping cycle occurs. With increasing rain amounts, the respective pause time is shortened. As soon as the pause time falls below a specified value and a correspondingly increased rain amount is detected, the drive motor 11 is controlled by the characteristic curve 19 to run continuously at low speed. If the detected amount of rain increases further, the speed of drive motor 11 is adjusted toward higher values, until it reaches its maximum value M for high rain amounts. With decreasing rain amounts, the drive motor 11 is controlled in the opposite direction.

Independent of the automatic control operation that depends on the rain amount, a fixed speed can be switched on for the drive motor 11 by using the wiper switch 18 to switch to stage 2. An even higher speed can be adjusted by further switching to the stage 3. In accordance with the relevant specifications, the number of wiping operations in switching stage 2 is 40 per minute, for example, and the number of wiping operations in switching stage 3 is 55 per minute. For this, the maximum speed of drive motor 11 is higher for the operation in switching stage 1, which depends on the amount of rain, than the speed in switching stage 3.

In order to change the wiping characteristic predetermined by the characteristic curve 19 to match the driver requirements, the control circuit 16 is provided with an algorithm adaptation control, which permanently changes the characteristic curve data if respective control commands are input.

The wiper switch 18 is used for this, and an evaluation is made as to when the driver changes the operating data, predetermined during the automatic wiping operating in switching stage 1, by switching to the stage 2 or 3. The control commands derived thereof are evaluated in the algorithm-adaptation control.

Figure 4:
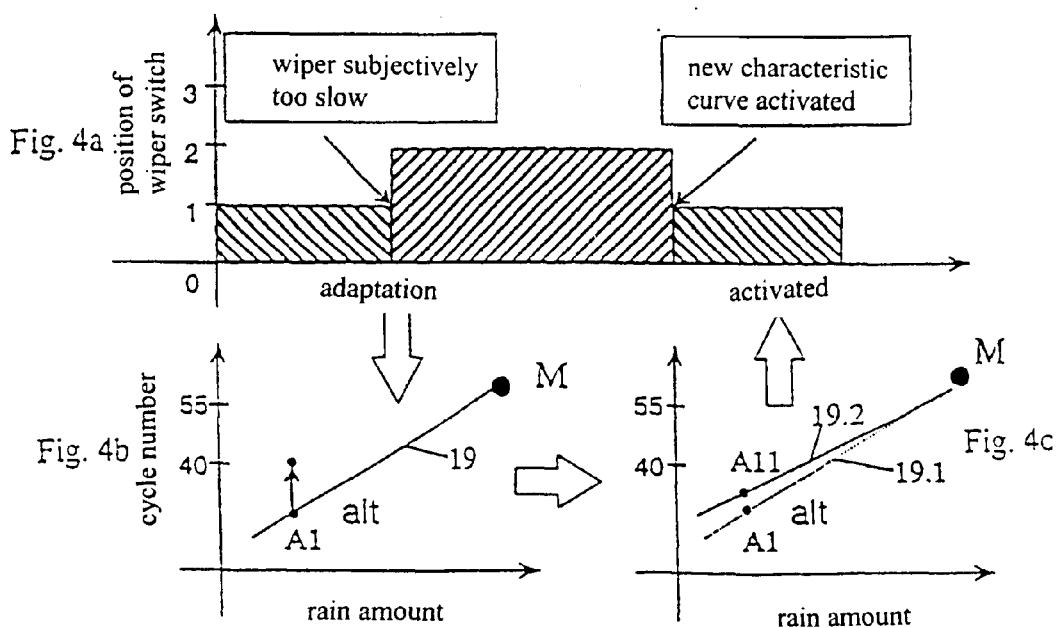
FIG. 4 shows a basic diagram for changing a characteristic curve assigned to an advantageous modification of the control device according to the invention.

If the subjective wiper 13 operation is too slow or too infrequent, according to FIG. 4a, then the driver switches the wiper switch 18 to continuous operation in switching stage 2 or 3. FIG. 4b illustrates this switching operation for switching stage 2, starting with the characteristic curve 19 for an operating point A1. The control signal derived from the switching operation causes the operating point A1 to be raised to a new operating point A11 in the algorithm-adaptation control according to FIG. 4c. New operating data are simultaneously computed for the complete new characteristic curve 19.1 with reduced slop, but the same end point M for the highest amount of rain. The characteristic curve 19 is thus pivoted around the center M in clockwise direction. In the process, the value for the change from operating point A1 to the operating point A11 is less than the absolute value of the control command between the operating point A1 and the number of cycles per time unit according to switching stage 2. In that case and with a direct switching upward from the switching position 1 to the switching position 3, the operating point can be increased by an amount that is higher than for the switching from stage 1 to stage 2. If subsequently the wiper switch is again switched back to stage 1 for the automatic operation, the drive motor is controlled according to the new characteristic curve 19.1 with shortened pauses for the intermittent operation or an increased number of continuous wiping cycles for higher rain amounts.

This characteristic curve is maintained until no switching to the switching stages 2 or 3 is considered necessary. It is desirable if the operating data are not changed too drastically during a switching operation, preferably by less than 50%. If a switching upward to the switching stages 2 or 3 causes only a slight change, preferably less than 5%, then a further re-calculation of the characteristic curve does not make sense. It can also be advantageous in this case to take over a new characteristic curve as changed characteristic curve for the control, but only if the manual control means are switched back to the characteristic-curve controlled first stage within a predetermined time period. However, it can also be useful if several independent characteristic curves are deposited in the control circuit, such that they can be called up. In that case, it can be advantageous if the individual characteristic curves are deposited so that they can be called up via the manually activated control means, which here is a selector switch.

Figure 5:
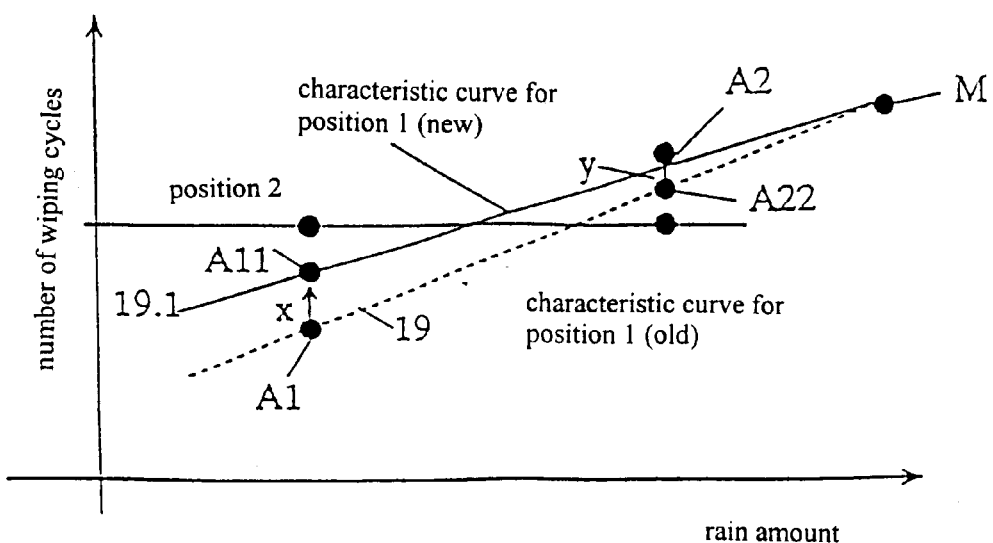
FIG. 5 shows a characteristic curve with different operating points.

The change of the characteristic curve from operating point A1 to operating point A11 is again shown in FIG. 5. In addition, it is shown therein that an increase in the slant of the current characteristic curve 19.1, for example to the slant according to the original characteristic curve 19 is possible with the aid of wiper switch 18 if the operating point A2 specifies operating data, which are above the operating data of the values predetermined for position 2. If the wiper switch 18 accordingly is switched from the automatic switching stage 1 to the switching stage 2 with fixed speed, the control signal derived thereof is negative and provides a new operating point A22, which in the present case by accident happens to be on the original characteristic curve 19. The algorithm-adaptation control in the control circuit 16 thus generates the current characteristic curve 19 for this operating point A22, which specifies the operating data for drive motor 11 that control a reduced number of cycles per time unit or an increase in the intervals for the intermittent operation. The same slope-increase function can also be achieved in that the wiper switch is switched by the rain-dependent automatic stage 1 to the zero position while the ignition turned on or the vehicle drive motor is still operational and the control command obtained in this way is transmitted to the algorithm-adaptation control.

The adaptive adjustment of the characteristic curve can be applied to the standard characteristic curve 30, 33 as well as the limit characteristic curve 31, 34, so that a subjectively improved windshield wiping function can be achieved for bright conditions or darkness or with high or low temperatures.

Of course, it is also possible to provide control means for influencing the slope of the characteristic curve or for selecting individual, different characteristic curves, which characteristic curve can be activated independent of the wiper switch by the driver of the vehicle or a maintenance facility. The selection of a driver-specific characteristic curve is possible even if the motor-vehicle control processes such memory functions as adjusting the seats and the mirror or coding of the ignition key. By calling up one of these driver-dependent functions, the associated characteristic curve for the wiper operation can be selected.

When switching from the steering column switch to the OFF stage, one advantageous modification makes it possible to distinguish whether the user actually wants to switch off only the windshield wiper 13 or whether the interval pauses appear too short. That is to say, if longer interval pauses are required for the current, small amount of rain. If the switch is switched off because the interval pause times appear too short, an adaptation of the characteristic curve 19 is advantageous. However, if the wiping must actually be stopped, an adaptation is not necessary. To make a distinction between these two cases, the rain sensor 15 is read for a limited time, at most 1 minute, following the switching of the switch to the OFF position. If the rain sensor 15 no longer detects any rain, it can be assumed that the switch was actually turned off. If the amount of rain measured during the limited time exceeds a predetermined threshold value, it is assumed that the interval pause time was too short and the characteristic curve 19 is adaptively adjusted.

On the whole, this results in a control device for the drive motor of a windshield wiper, for which the rain-dependent characteristic curve for controlling the drive motor can be changed later on, wherein the operating data of the drive motor can be changed in dependence on environmental conditions. This increases the vehicle comfort as well as the safety in difficult traffic situations. In addition, manually actuated control means can be used for the input of corresponding control commands. The existing multi-stage wiper switch in the vehicle preferably can be used for these control means. In the process and referring to the actual characteristic curve, a determination is made at the momentary operating point specified by the determined rain amount whether the user desires a higher or lower number of wiping cycles during further switching operations. A corresponding change in the slope or course of the characteristic line is then derived from this information.

What is claimed is:

1. A control device for the drive motor of a windshield wiper device on a vehicle, in particular a motor vehicle, comprising a manually operated wiper switch with at least first, second and third switching stages wherein automatic operation based on the characteristic curve is assigned to the first switching stage and fixed speeds are assigned to the second and third switching stages, a control circuit, a rain sensor that is connected to the control circuit, a light sensor that is connected to the control circuit, a temperature sensor that is connected to the control circuit, wherein characteristic curves are deposited in the control circuit in dependence on the output signals from the rain sensor, the light sensor and the temperature sensor, which characteristic curves contain the operating data for the drive motor, and wherein a rain-dependent standard characteristic curve is deposited in the control circuit and if at least one value for temperature or light intensity falls below its limit value in the control circuit during the windshield wiper operation, the control circuit causes a limit characteristic curve that is changed relative to a the standard characteristic curve to be made available and used for control, with these standard and limit characteristic curves have having a common fixed upper end point (M).

2. A control device according to claim 1, wherein the transition from the standard characteristic curve to the limit characteristic curve, via intermediate characteristic curves between the standard characteristic curve and the limit characteristic curve, is at least quasi continuous, and the intermediate characteristic curves, the standard characteristic curves and limit characteristic curves have a fixed upper end point (M).

3. A control device according to claim 1, wherein the speed for the transition from a standard characteristic curve to a limit characteristic curve depends on the degree to which the temperature and/or light intensity deviates from the respective limit values.

4. A control device according to claim 1, wherein the transition from the standard characteristic curve to the changed characteristic curve is abrupt.

5. A control device according to claim 1, wherein if the light intensity affecting the vehicle is below a specified light intensity, the drive motor speed is increased and/or the interval pauses for the intermittent wiper operation are shortened and/or the transition from the intermittent operation to the continuous operation is shifted to lower amounts of rain.

6. A control device according to claim 1, wherein the operating data for the drive motor can be changed in case of blinding.

7. A control device according to claim 1, wherein if the temperatures fall below a limit temperature, the drive motor speed is lowered and/or the interval pause time for the wiper operation is increased and/or the transition from intermittent operation to continuous wiper operation is shifted to higher rain amounts.

8. A control device according to claim 1, wherein the limit temperature is approximately 0° C.

9. A control device according to claim 1, wherein for light intensity and temperature values below the respective limit values, the drive motor speed as well as the interval pauses of the wiper operation are increased and/or the transition from the intermittent wiper operation to the continuous wiper operation is shifted to lower amounts of rain.

10. A control device according to claim 1, wherein the operating data for the drive motor for a wiper operation with windshield washing function can be changed.

11. A control device according to one or several of the preceding claims, characterized in that claim 1, wherein the operating parameters of the drive motor can be changed in all switching stages.

12. A control device according to claim 1, wherein, via the control circuit, the speed of drive motor is changed in all switching stages if the value for the light intensity falls below the limit value.

13. A control device according to claim 1, wherein the characteristic curve can additionally be changed by manually operated control means.

14. A control device according to claim 1, wherein during the windshield wiper operation, an adaptation algorithm for generating a new characteristic curve is additionally realized in the control circuit, the characteristic curve and the new characteristic curve, each having a fixed common upper end point (M) and the slope or the course of the characteristic curve is changed analog to the difference between the actual operating data specified by the additional switching positions, provided an additional switching position is switched on manually.

15. A control device according to claim 14, wherein the slope or the course of the characteristic curve is reduced if the operating data for the drive motor, which are specified by the actual characteristic curve are lower than the operating data specified by the additional switching stages and an additional switching position is manually activated.

16. A control device according to claim 14, wherein the slope or course of the characteristic curve is increased if the operating data for the drive motor specified by the actual characteristic curve are higher than the operating data specified by the additional switching stages and if an additional switching position is manually activated.

17. A control device according to claim 14, wherein the changed characteristic curve is accepted by the control circuit as a new characteristic curve, but only if the manual control means are switched back within a predetermined time period to the first switching stage that is controlled by the characteristic curve.

18. A control device according to claim 14, wherein the change of the operating data specified by an updated characteristic curve to the operating data of the preceding characteristic curve is limited to no more than 50%.

19. A control device according to claim 18, wherein the characteristic curve is updated until the operating data from two successively generated characteristic curves deviate by less than 5%.

20. A control device according to claim 1, wherein several independent characteristic curves are deposited in the control circuit and can be called up.

21. A control device according to claim 1 wherein the individual characteristic curves can be activated via manually activated selector switches in the control device for an individual control of the operating data for the drive motor.

22. A method of controlling a drive motor of a windshield wiper device on a vehicle, in particular a motor vehicle, having a control arrangement comprising a manually operated wiper switch with at least first second and third switching stages wherein automatic operation based on a characteristic curve is assigned to the first switching stage and fixed speeds are assigned to the second and third switching stages, a control circuit for activating the wiper switch and controlling the drive motor for the wiper switch based on a characteristic curve, a rain sensor, a light sensor and a temperature sensor that are each connected to the control circuit, said method comprising:

providing characteristic curves in the control circuit in dependence on the output signals from the rain sensor, the light sensor and the temperature sensor, which characteristic curves contain operating data for the drive motor, and controlling the motor based on the characteristic curves; and wherein one of the characteristic curves contained in the control circuit is a rain-dependent standard characteristic curve, and further comprising, if at least one value for temperature or light intensity falls below its respective limit value in the control circuit during the windshield wiper operation, providing a limit characteristic curve that is changed relative to the standard characteristic curve and has a fixed same upper end point (M) as the characteristic curve, and using the limit characteristic curve for subsequent control by the control circuit.

* * * * *